Figure 1:
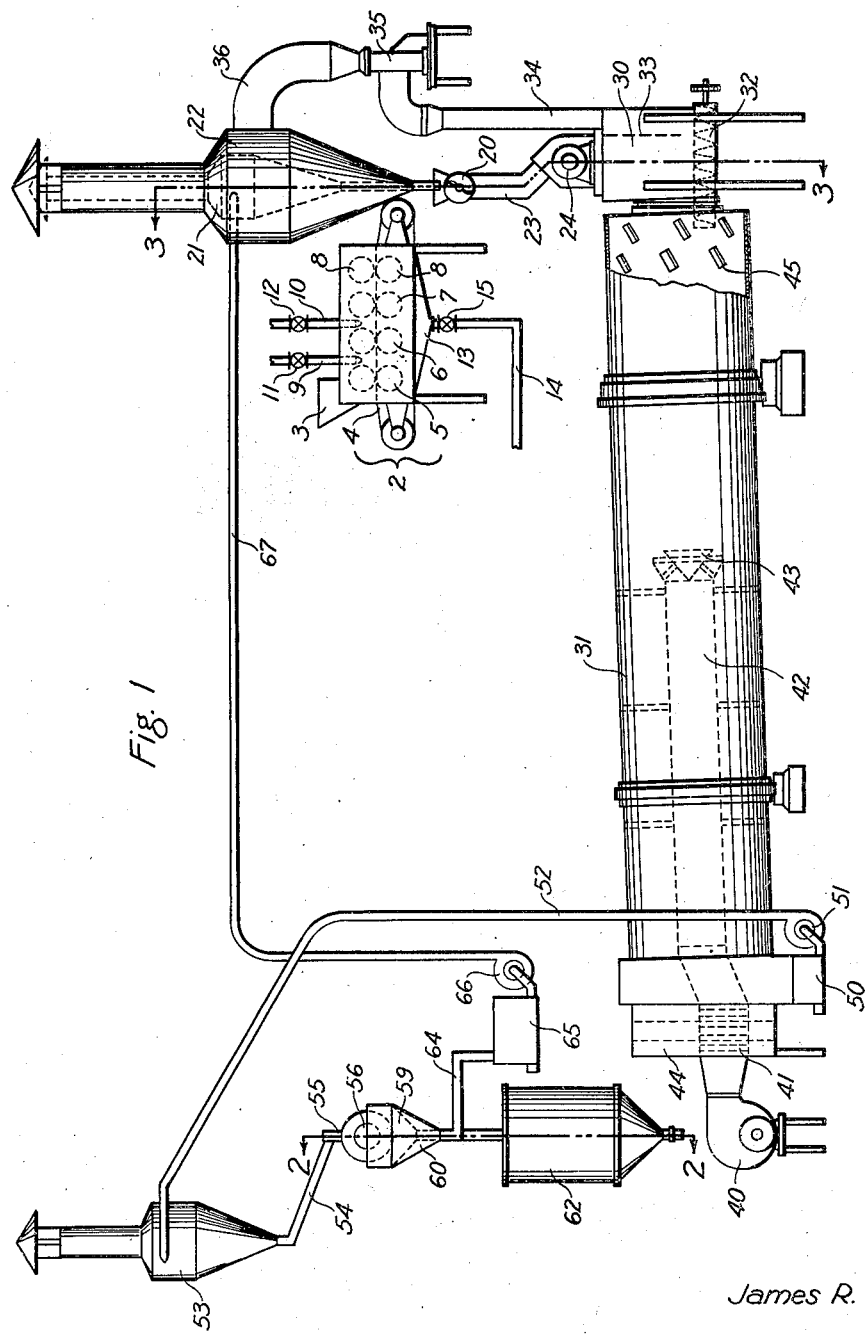

March 29, 1938.   J. R. COFFEY   2,112,558
METHOD OF PRODUCING HOMOGENEOUS CASEIN
Filed Nov. 6, 1934   2 Sheets-Sheet 1

Inventor
James R. Coffey
By W. E. Sherwood
Attorney

March 29, 1938.　　J. R. COFFEY　　2,112,558
METHOD OF PRODUCING HOMOGENEOUS CASEIN
Filed Nov. 6, 1934　　2 Sheets-Sheet 2
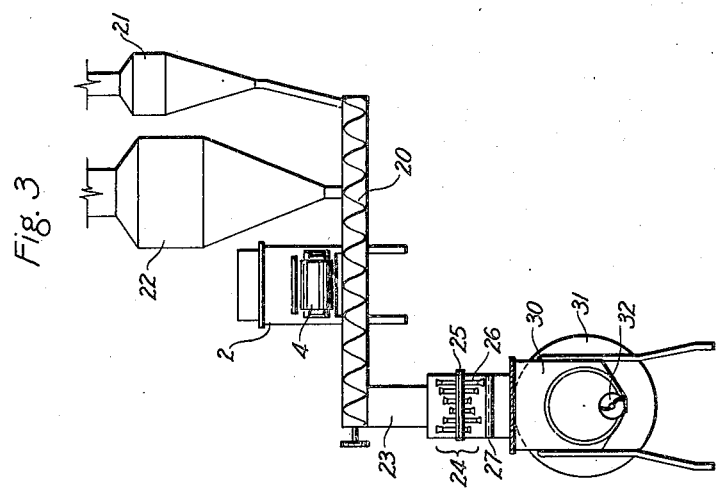
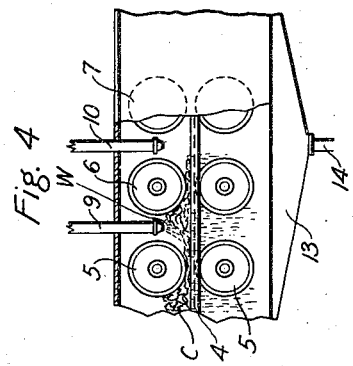
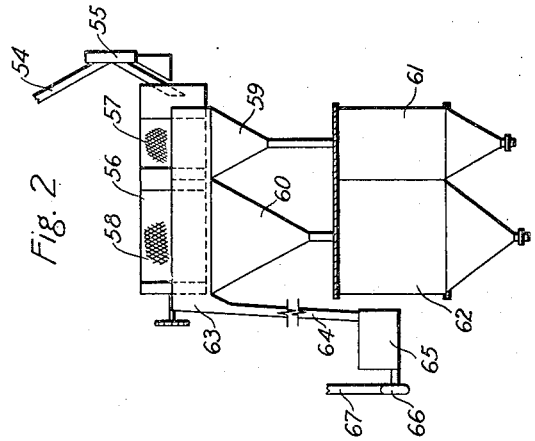
Inventor
James R. Coffey
By　W. E. Sherwood
Attorney Patented Mar. 29, 1938

2,112,558

UNITED STATES PATENT OFFICE 2,112,558

METHOD OF PRODUCING HOMOGENEOUS CASEIN

James R. Coffey, Louisville, Ky., assignor to Louisville Drying Machinery Company, Incorporated, Louisville, Ky., a corporation of Kentucky Application November 6, 1934, Serial No. 751,745

4 Claims. (Cl. 106—38)

The invention relates to a new, rapid and dependable method of manufacturing casein and is characterized particularly by the superior grade of product which it produces.

Industries in which casein is widely used, such as in the manufacture of paper, glues, paints, plastics and the like, require an especially high grade, uniform quality of product, and as a result, exacting demands are placed upon the manufacturers of such casein. Generally speaking, the characteristics most desired of a casein product are light color, low viscosity, low ash content, ready solubility, lack of foaming when dissolved, and small, uniform size of the casein particles. Each of these desirable qualities may be obtained by following the teaching of my invention, as will be more fully set forth hereinafter.

The importance of casein in the industries has given rise to much experimentation in regard to methods of producing the same. However, due to the many factors involved in each of the several separate steps comprising its manufacture, no method has been developed heretofore which could assure an output of invariable, homogeneous, high-quality product.

In general, casein is found in milk in the form of a proteid held in a state of colloidal suspension. In order to make this proteid colloid available a precipitation step is necessary. This has been accomplished by natural lactic acid fermentations or by the addition of certain other acids to the milk. However, various disadvantages present themselves in such precipitation steps chiefly in that the precipitated casein curds may occlude various impurities as well as embody varying amounts of different constituents found in the milk. Unless the amount of precipitation agent used is carefully mixed with the milk a non-uniform grade of casein will result. Such casein will have a high ash content and will contain acid rendering the final product undesirable.

After precipitation of the casein curds they must be thoroughly washed in order to rid the curds of acid, impurities and certain milk constituents such as sugar and soluble salts, which tend to form an ash. The washed curds are then pressed and dried to form the final product.

These several steps in the manufacture of casein have long been known and practiced, but they have certain inherent disadvantages, as will more fully appear hereinafter. By experimentation I have found that if the casein is manufactured quickly, using an improved precipitation process, and treating the precipitated curds in the manner outlined hereinafter, the resulting product will invariably have the desired characteristics set forth above. Moreover, the cost of manufacturing the same will be greatly reduced due to the continuity of the process and the elimination of manual labor with its attendant irregularities. For example, by the use of my improved process it has been found that the precipitated curds can be taken from the vats, pressed, washed, dried and stored in 30 minutes time or less, whereas in most of the processes now in general use the same operations will consume 24 hours or even longer.

It appears that the drying step and the precipitation and washing step are the most important phases in the entire process of manufacture. Indeed these steps are mutually dependent upon one another for the production of a desirable final product, and unless they are coordinated the desired result cannot be obtained.

If the precipitation and washing is not properly carried out, the final product will contain acid, will be more or less insoluble, will have a high ash content and will foam upon going into solution regardless of the efficiency and care used in the drying. The essential relationship of proper washing to proper drying of casein is more fully explained at page 14 of Circular No. 279 of the United States Department of Agriculture, dated July 1933 and entitled "Methods of Manufacturing Acid-Precipitated Casein from Skim Milk". On the other hand if a superior grade of casein curd leaves the precipitation and washing apparatus, it may be rendered inferior through an improper drying operation. The casein particles may become glazed giving rise to a low solubility index, they may be overheated or burned giving rise to a dark colored product or they may be dried in large, heterogeneous bodies, giving rise to a final product which has more than the prescribed amount of moisture and which will mold and ferment.

In order to avoid these troubles, certain processes of manufacture use elaborate drying apparatus, requiring a large room for housing the same, which apparatus slowly dries the damp casein curds, and requires an additional grinding or milling operation for the casein after it leaves the dryer.

My invention on the other hand utilizes a minimum of apparatus which may be compactly housed in a small building, and which may be operated entirely automatically requiring only a minimum of personal attention. A prime object of the present invention, therefore, is the teaching of a new, rapid and dependable method of manufacturing casein requiring a minimum of apparatus and manual labor.

A second object is the provision of a new and improved method of pressing and washing casein curds prior to the introduction of the same into a dryer apparatus.

A third object is the provision of a new and improved method of drying casein whereby a homogenous, high quality product may be produced.

Another object is the production of improved casein product having the desirable characteristics outlined above.

Other objects and advantages of the invention not at this time more particularly enumerated will be readily understood from the following description of the same when taken in connection with the drawings, of which; Fig. 1 is a view in elevation partially in section, and showing the general arrangement of an apparatus adapted for carrying out the invention, Fig. 2 is a diagrammatic view taken on line 2—2 of Fig. 1; Fig. 3 is a diagrammatic view taken on line 3—3 of Fig. 1, and Fig. 4 is a schematic view of a portion of the pressing and washing apparatus shown on a larger scale.

Referring to Fig. 1; a combined pressing and washing apparatus indicated generally as 2 is provided with an inlet hopper 3 into which precipitated casein curds may be fed from any convenient source.

These curds in the form of a porous, spongy mass fall upon a moving screen 4 and are carried between a series of duplicate rolls 5, 6, 7, and 8. As will be explained hereinafter the purpose of these rolls is not to express all the moisture from the curds forming a hard pressed sheet of curd. On the contrary, these rolls function to press from the spongy mass of curds any whey which it may still contain and to form a barrier so that water may pass through the curds on screen 4 and thus give an additional washing and filtering effect to the porous casein.

In order to accomplish this desirable washing and filtering step, pipes 9 and 10 controlled by valves 11 and 12 are inserted in apparatus 2 and terminate in spray nozzles above the moving screen and between rolls 5, 6 and 6, 7 respectively. Washing water of suitable temperature and character flows through pipes 9 and 10 and may be sprayed upon the casein as circumstances dictate. The whey held by the curds together with the water introduced through pipes 9 and 10 collect in a container 13 at the bottom of apparatus 2, and may be drained off through pipe 14 controlled by a valve 15.

As best shown in the schematic view of Fig. 4, the pourous, spongy mass of casein curds C is first carried by moving screen 4 between rolls 5 and the pressure of these rolls serves to press out a large amount of the whey and water held by the curds. After passing rolls 5 the resilient porous curds expand and at this time water is sprayed upon the casein from the pipe 9. This water filters through the curds as they move toward rolls 6 and effects a washing and filtering action which takes from the casein any remaining whey, acid, soluble salts and the like. The water carrying with it these impurities then passes into the container 13 at the bottom of the apparatus.

This washing and filtering effect is further enhanced by the sheet of water W which backs up behind roll 6 and which runs back over the porous casein in a continuous sheet, subsequently filtering through the casein curds.

If necessary, a second washing and filtering step takes place in a similar manner between rolls 6 and 7 while the final set of rolls 8 serve the purpose of extracting moisture from the casein.

The material leaving apparatus 2 is in the form of a damp, porous sheet having approximately 50%–55% of moisture. This sheet of casein is discharged into a conveyor 20, best shown in Fig. 3. As the casein sheet falls from apparatus 2 it is broken into heterogeneous lumps which are further broken up by the action of the conveyor screw.

At one end of conveyor 20 a connection with a separator 21 leads into said conveyor certain oversized, dried particles of casein more fully described hereinafter.

Also leading into conveyor 20 is a connection from the large exhaust separator 22 whereby the dried casein dust recovered from the exhaust heating medium may be conducted into the conveyor.

Conveyor 20 is driven by any suitable means (not shown) and may be of any desired length. As it moves the dried casein particles, the dried casein dust and the damp casein curds toward the outlet pipe 23, it effects a thorough mixing of these materials, the result of which is a lowering of the moisture percentage in the mixed material. It is found that in the normal operation of my process sufficient dried dust and dried oversized particles will be present to lower the moisture percentage of the material from 50–55% to 40–43%. The advantage of this lowered moisture content is obvious. It lessens the load on the main dryer by allowing it to operate more efficiently, making possible a smaller, less expensive dryer, it accelerates the drying operation by having the casein in a better condition for drying and it affords a ready use for the casein dust and oversized particles which would otherwise require further treatment.

The mixed material pass from the conveyor into an outlet pipe 23 whence they fall by gravity into a mill apparatus 24 best shown in Fig. 3. This mill may be of any suitable construction, but I have found a "hammer" type mill to be especially desirable. In this type, a shaft 25 driven at high speed by any suitable means (not shown) carries a series of movable weights 26 which strike against the material falling into the mill from pipe 23 and hammer the material through a screen 27 having small apertures therein. The apertures of said screen are of such size that the small grains of damp casein passing through the screen are of a proper size for the use to which the dried casein is to be put.

The shower of small particles of damp casein leaving mill 24 falls into a housing 30 communicating with an inclined rotary dryer 31.

Within said housing 30 is a conveyor 32 extending into the open end of the rotary dryer and driven by any suitable means (not shown).

The drying medium used in said dryer passes through the screen of damp casein particles coming from mill 24, passes around a baffle 33 in housing 30 and is withdrawn through an exhaust pipe 34 by the action of a fan 35 driven by any suitable means (not shown).

Fan 35 directs the exhaust drying medium through a pipe 36 into separator 22. Since the drying medium is in intimate contact with the material to be dried in dryer 31 a certain amount of light casein dust will be carried out by the exhaust drying medium. When such exhaust enters separator 22 this light casein dust will strike against the walls of the separator and fall to the bottom of the same and into conveyor 20, the exhaust drying medium meanwhile escaping through the separator vent.

In order to accomplish a rapid drying operation and at the same time use a dryer of small over all dimensions, I prefer to use a rotary dryer of the counter-current type although it is obvious that in so far as the invention as a whole is concerned other types of driers may be utilized. In the dryer which I employ a fan 40 driven by any suitable means, forces a drying medium through heating elements 41 and into an elongated conduit 42 which terminates in a flared open end having a conical shaped member 43 secured thereto, the purpose of which will later become apparent. Through the action of exhaust fan 35 additional drying medium is drawn into the dryer, passing over separate heating elements 44 and moving between the conduit 42 and the dryer casing 31.

The damp casein grains entering housing 30 have an appreciable weight due to the moisture which they contain. The conveyor 32 moves said damp particles into the dryer 31 and drops them upon the revolving dryer surface. Secured to the inner surface of the dryer throughout its length are series of lifting flights or baffles 45 the purpose of which is to cascade the casein particles in the form of a screen across the dryer cross section. These baffles may assume different forms and dimensions and it is to be understood that my invention is limited in no way to the illustrative forms as shown.

When conveyor 32 discharges the heavy, damp casein grains upon baffles 45 these baffles scatter said grains across the revolving dryer and due to the inclination of the dryer and the weight of the casein particles, said particles move toward the lower end of the dryer. Since this scattering action is taking place all along the length of the dryer the drying medium is brought into direct contact with the casein and a rapid heat transference takes place. At the same time these continuous screens of casein grains form a resistance to the movement of the drying medium and prevent a short circuiting of any part of the drying operation.

By the time the casein has moved along the dryer to the vicinity of the open end of conduit 42 said casein has lost the greater part of its moisture and has become correspondingly lighter. It is desirable therefore, that in its further movement to the outlet of the dryer it should encounter less resistance from the heating medium and especially since this is the dangerous part of the drying step it should also be dried by a medium of lower temperature. It has been found that after the greater part of the moisture is driven off, subsequent drying should be slow and at a reduced temperature in order to avoid scorching and discoloration of the final product. For this reason I find it advantageous to use a drying medium of approximately 170° F. in the conduit 42 and a medium of approximately 120°–130° F. in the annular space around said conduit. If these temperatures be used in connection with the assembly herein disclosed, the casein will leave the dryer with a temperature of approximately 96°–103° F. and the entire drying step may be completed in approximately 20 minutes time.

After the partially dried casein grains enter the annular space of the dryer around conduit 42 they move on to the lower end of the dryer and fall into a container 50. The casein is prevented from passing into conduit 42 because of member 43 which obstructs the entrance of said conduit and which disperses the stream of heating medium leaving the conduit.

From container 50 the dried casein containing between 6% and 8% moisture is picked up by a stream of air drawn by a fan 51 and is directed into a pipe 52 leading to separator 53. From separator 53 the dried casein falls through pipe 54 into a receptacle 55 leading into the upper end of an inclined rotary cylindrical screen 56.

This rotary screen, best shown in Fig. 2, is driven by any suitable means and comprises two sections, the first of which embodies a fine mesh screen 57 and the second of which embodies a coarser mesh screen 58. The particular size mesh employed will obviously depend upon the size of casein grain required. Beneath each section 57 and 58 of the revolving screen are hoppers 59 and 60 leading to storage bins 61 and 62 for the dried casein.

The casein placed on the rotary inclined screen 56 will filter through the wire mesh 57 and 58 in accordance with the size of the casein particles. Any casein particles which are too large to pass through these screens, and which accordingly would be undesirable for the use to which the casein is to be put, will move along this inclined screen and fall into a container 63 from which they pass by means of a pipe 64 into a container 65.

An air stream drawn through container 65 by fan 66 picks up these oversized casein particles and moves them through pipe 67 into separator 21 where they strike against the walls of the separator and fall into the conveyor 20 the air stream meanwhile passing out of the separator vent.

It will be readily apparent from the foregoing description that my improved process has many desirable features not found in present practice. It is a continuous process and as precipitated casein curds are fed into apparatus 2 the final dried product is continually leaving the system. The process is rapid and dependable. Through the use of conventional control means such as temperature and pressure regulating means the conditions in the dryer can be accurately regulated. Due to the continuity of the process the apparatus used has relatively small dimensions and may be housed in a small building. Moreover, since the operation of such apparatus is entirely automatic, manual labor is eliminated and the production costs are correspondingly lower.

The casein produced by this process has many marked characteristics. Due to the use of a hammer mill, a rapid drying and an efficient screening operation, the product contained in bins 61 and 62 is of uniform size, has the form of small grains and is dried to such an extent that it will not mold or ferment.

Due to the particular drying method employed, the casein grains are uniformly dried throughout, will not have glazed outer surfaces and are of a uniform light color. The final phase of the drying operation, while the particles pass through the annular space between conduit 42 and the dryer surface 31, is carried out in a lowered temperature and consequently precludes the possibility of scorching the casein.

Due to the efficient washing, filtering and pressing operation conducted in the apparatus 2 the casein entering the dryer will not contain the acid, soluble salts and occluded impurities which would cause foaming, ash and insolubility of the final product.

Having thus disclosed the invention, it is obvious that variations of the same may be resorted to without departing from the scope of the same and it is my intention to cover by the appended claims such changes as may reasonably be included within the scope thereof.

I claim:

1. The method of manufacturing a homogeneous casein product comprising, pressing substantially all of the whey from the precipitated curds of high ash content and forming a porous, spongy sheet of casein, spraying water on said porous sheet, filtering said water through said porous sheet to rid the casein of any remaining impurities, pressing the filtered sheet to express therefrom a large part of its moisture, mixing with the damp pressed curds a portion of light, dried casein dust, mixing with the pressed curds and dried dust a portion of large, oversized, dried casein particles, milling the mixed materials and forming small, uniform particles, drying these particles, screening the dried particles, storing the screened particles of desired size, returning the large, oversized, dried particles to be mixed with the damp, pressed curds, recovering from the exhaust of the drying medium the light casein dust and returning such dried dust to be mixed with the damp, pressed curds.

2. In the manufacture of acid-precipitated casein of low ash-content, the method of removing ash-forming constituents therefrom comprising, compressing a precipitated curd of high ash-content and extracting whey therefrom, removing the compressed curd from the pressing step in the form of a porous, spongy sheet, spraying wash water upon the porous curd, filtering the water through the curd and pressing the washed curd to remove moisture and residual whey therefrom.

3. In a manufacture of acid-precipitated casein of low ash-content, the method of removing ash-forming constituents therefrom comprising, compressing the wet precipitated curd of high ash content and extracting whey therefrom, removing the compressed curd from the pressing step in the form of a porous, spongy sheet, spraying wash water upon the curd, filtering a part of the wash water through the spongy curd by gravity, forcing the remainder of the wash water through the curd by pressure, and pressing the resulting, washed curd to remove moisture and residual whey therefrom.

4. In the manufacture of acid-precipitated casein of low ash-content, that method of removing ash-forming constituents therefrom comprising, pressing substantially all of the whey from the casein, forming a porous, spongy sheet of casein curd, spraying wash water upon the upper surface of the sheet, filtering water through the sheet, pressing the washed sheet to remove moisture and residual whey therefrom and delivering the pressed curds to a drier.

JAMES R. COFFEY.